United States Patent [19]

Yates et al.

[11] Patent Number: 5,755,283
[45] Date of Patent: May 26, 1998

US005755283A

[54] COMBINED THERMOSTAT AND SELECTOR VALVE ARRANGEMENT FOR GAS DRIVEN HEAT PUMP SYSTEMS

[75] Inventors: Jan B. Yates, Reynoldsburg; Larry E. Schluer, Sugar Grove, both of Ohio

[73] Assignee: Gas Reasearch Institute, Chicago, Ill.

[21] Appl. No.: 761,433

[22] Filed: Dec. 6, 1996

Related U.S. Application Data

[60] Provisional application No. 60/008,383, Dec. 8, 1995.
[51] Int. Cl.⁶ ............................................. F01P 7/16
[52] U.S. Cl. ..................... 165/297; 165/300; 236/34.5
[58] Field of Search ............... 236/34, 34.5; 165/296, 165/297, 300

[56] References Cited

U.S. PATENT DOCUMENTS

| | | | |
|---|---|---|---|
| 3,378,063 | 4/1968 | Mefferd | 165/40 |
| 4,697,434 | 10/1987 | Yuyama | 62/238.7 |
| 4,754,614 | 7/1988 | Yuyama | 62/238.6 |
| 4,976,464 | 12/1990 | Swenson | 237/81 |
| 5,000,011 | 3/1991 | Hayakawa | 62/324.1 |
| 5,020,320 | 6/1991 | Talbert et al. | 62/238.7 |
| 5,099,651 | 3/1992 | Fischer | 62/79 |
| 5,192,022 | 3/1993 | Swenson | 237/2 B |
| 5,226,594 | 7/1993 | Swenson | 237/2 B |
| 5,243,825 | 9/1993 | Lin | 62/238.7 |
| 5,249,742 | 10/1993 | Atterbury et al. | 237/2 B |
| 5,253,805 | 10/1993 | Swenson | 237/2 B |
| 5,275,231 | 1/1994 | Kuze | 236/34.5 |
| 5,529,026 | 6/1996 | Kurr et al. | 236/34.5 |

Primary Examiner—William E. Tapolcai
Attorney, Agent, or Firm—Dick and Harris

[57] ABSTRACT

A combination thermostat and selector valve for a prime mover for a gas driven heat pump system is positioned upstream of the prime mover in a heat pump system, so that the coolant for the prime mover will be maintained at a substantially constant temperature without regard to load or outdoor ambient conditions.

10 Claims, 5 Drawing Sheets

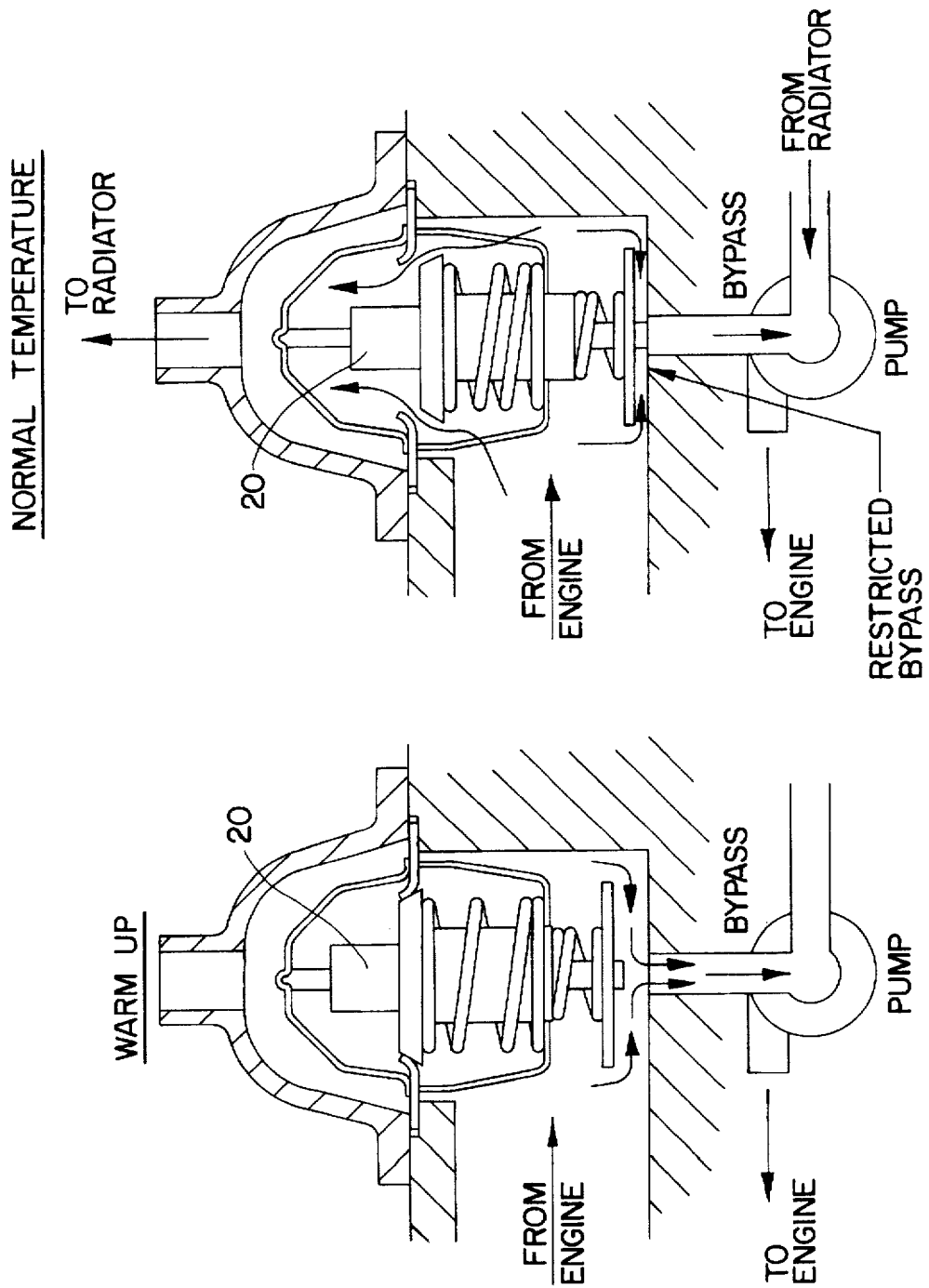

5,755,283

1

COMBINED THERMOSTAT AND SELECTOR VALVE ARRANGEMENT FOR GAS DRIVEN HEAT PUMP SYSTEMS

This application depends from and claims priority of U.S. Provisional Application Ser. No. 60/008,383, filed Dec. 8, 1995.

BACKGROUND OF THE INVENTION

1. Field of the Invention

The present invention relates to heat pump systems for the thermal conditioning of spaces. In particular, the present invention relates to heat pump systems which employ a gas-engine as a prime mover for the heat pump.

2. The Prior Art

Gas driven heat pump systems typically utilize as a prime mover a power plant which must be provided with a liquid cooling system, in order to enable the prime mover to operate for extended periods of time. Typical prime movers include internal combustion reciprocating engines. Such IC engines typically are configured substantially similar to automotive type engines. Accordingly, since some of the operating conditions (running at speed for hours at a time) are common to both auto engines and heat pump engines, attempts have been made to adopt many components utilized in automotive applications to gas driven heat pump applications.

Attempts have been made, for example, to employ automotive-type coolant system configurations in heat pump applications. Most auto engines utilize a cooling system which features the components illustrated in FIGS. 1 and 2. The flow of coolant from the engine coolant passages to the radiator is controlled by a thermostat 10. Flow can either be directed to a bypass passage, to the coolant pump and back to the engine, or a portion of the coolant can be directed to the radiator, and then to the pump and back to the engine. When the engine is cold (FIG. 1), the thermostat 10 is closed, and all of the coolant is directed to flow toward the bypass, through the pump and back to the engine. Once the engine has heated up to whatever temperature has been selected to actuate the thermostat 10, the thermostat 10 opens, and some portion of the flow is enabled to flow through the radiator.

Some auto engines have a more sophisticated system, which is illustrated in FIGS. 3 and 4. Thermostat 20 is substantially configured as a three-way valve. At start-up, when the engine is cold, like the previously described set-up, thermostat 20 is closed relative to the radiator, and no coolant goes from the engine to the radiator. However, once the engine has begun to warm up, lower disk 25 moves toward the opening for the bypass passage, restricting the amount of coolant which flows through the bypass passage. Restricting the bypass volume reduces the total pump flow required, as more and more of the coolant flow is diverted to the radiator as the engine warms up.

In the typical automotive applications described and illustrated in FIGS. 1-4, the thermostat in each case senses the temperature of the coolant as the coolant is exiting the engine. Such a system is advantageous in the environment of an auto engine wherein the flow rate of the coolant is high relative to the total volume of the coolant system.

In the environment of a heat pump system, however, difficulties with such a coolant system configuration may arise. The flow rate of the coolant, relative to the total volume of coolant in the system, is typically much lower

2 than in automotive systems. During warmup, a thermostat would remain closed until the engine has reached a desired operating temperature. The thermostat would then open and remain open until cooler liquid has filled the engine and reached the thermostat. The thermostat would then close until the coolant in the engine had again reached the maximum desired temperature, and the cycle would repeat. Such a phenomenon is particularly noticeable at low loads, during heating operations, when the heat being rejected from the engine is relatively low, and the coolant returning from an indoor heat exchanger is substantially at room temperature. As a result of the cycles as described, the thermostat would always be completely closed until all of the coolant in the engine was at operating temperature. The engine would be subjected to undesirable thermal cycling, and the average actual operating temperature of the engine, over time, would be substantially less than the thermostat operating point.

When an engine runs at less than a predetermined optimum operating temperature, thermal losses will occur, and the lubrication viscosity will increase, creating mechanical drag. Lowered engine temperatures can also permit water vapor which may be present in blowby gases to condense in the crankcase of the prime mover and dilute the lubricating oil.

It would be desirable to provided an improved cooling system configuration suitable for use with gas powered prime movers, such as would be utilized in a heat pump system, such a cooling system being configured so as to avoid subjecting the prime mover to excessive undesired thermal cycling.

It would further be desirable to provide an improved cooling system configuration which would operate substantially independently of external ambient conditions.

It would still further be desirable to provide an improved cooling system configuration which would maintain the engine temperature at a more constant level, and closer to the desired maximum optimum operating temperature.

Heat pump engines face other operating conditions which are substantially different from the circumstances faced by automotive cooling systems. For example, it has become a practice in the field of heat pumps to provide that the coolant from the prime mover is, during cooling seasons, directed to an outdoors radiator, while during heating seasons, the coolant is often directed to a different heat exchanger, one which will lead directly or indirectly to an indoor heat transfer structure, for contributing to the heating of the indoor space.

SUMMARY OF THE INVENTION

An apparatus for controlling the circulation of coolant fluid, for the coolant system for a prime mover, wherein the coolant system includes at least one heat exchanger operably disposed at a location separate from the prime mover.

The apparatus for controlling coolant circulation comprises a thermostatic valve apparatus, operably disposed in a first fluid circuit relationship with the prime mover and the at least one heat exchanger. The thermostatic valve apparatus is operably disposed at a position which is upstream of the prime mover, so that coolant exiting the at least one heat exchanger must pass through the thermostatic valve apparatus before entering the prime mover. The thermostatic valve apparatus is further operably configured to permit coolant flow from the at least one heat exchanger apparatus to the prime mover only when the coolant in the engine circuit has attained a predetermined minimum temperature.

In a preferred embodiment of the invention, the thermostatic valve apparatus is further operably disposed in a second fluid circuit relationship with the prime mover. The thermostatic valve apparatus is further operably configured to vary, in a modulating manner, the relative proportions of coolant permitted to flow through the first and second fluid circuits.

In an alternative preferred embodiment of the invention, wherein the thermostatic valve apparatus is further operably disposed in a second fluid circuit relationship with the prime mover, the thermostatic valve apparatus is further configured to permit flow of coolant through the second fluid circuit only when the coolant has a temperature which is above a predetermined minimum temperature.

In a preferred embodiment of the invention, the at least one heat exchanger includes two heat exchangers connected parallel to one another in fluid circuit relationship with the prime mover and the thermostatic valve apparatus, and the apparatus for controlling coolant circulation further comprises flow selection means, operably interposed in fluid circuit relationship between the two heat exchangers and the thermostatic valve, at a position downstream of the two heat exchangers. The flow selection means are operably configured to selectively permit flow through one of the two heat exchangers, to the exclusion of the other.

Alternatively, the flow selection means are operably interposed in fluid circuit relationship between the two heat exchangers and the thermostatic valve, at a position downstream of the two heat exchangers, and are operably configured to selectively modulate the relative proportion of flow from the two heat exchangers through the flow selection means.

Preferably, the thermostatic valve apparatus and the flow selection means are operably configured as a single integrated unit. In an embodiment of the invention, the flow selection means is a three-way valve.

In one embodiment of the invention, the prime mover is a gas-driven engine for a heat pump system. The prime mover may be a prime mover for a heat pump system, and one of the two heat exchangers may be a heat exchanger situated within a structure for transferring heat from the coolant to the air of an occupied space within the structure. One of the two heat exchangers may be a heat exchanger situated in an outdoor environment for transferring heat from the coolant to the ambient outdoor atmosphere.

BRIEF DESCRIPTION OF THE DRAWINGS

FIG. 3 is an illustration of a portion of a further prior art automotive cooling system, during warm up operations.

FIG. 4 is an illustration of the prior art automotive cooling system of FIG. 3, during normal temperature operations.

BEST MODE FOR CARRYING OUT THE INVENTION

Figure 2:
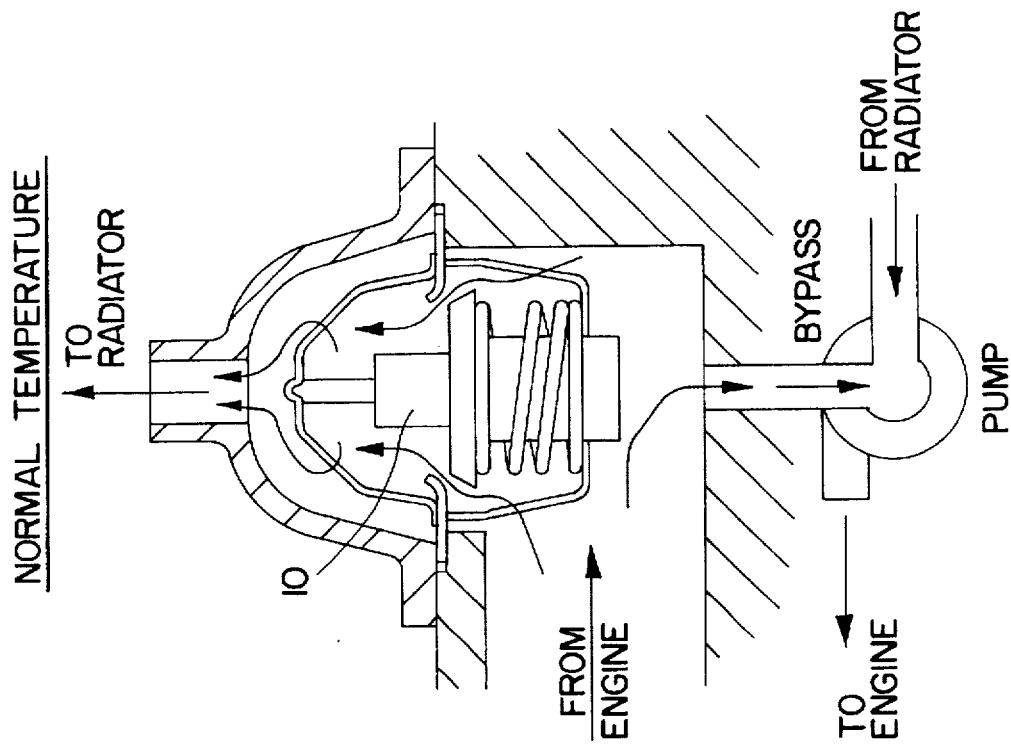
FIG. 2 is an illustration of the prior art automotive cooling system of FIG. 1, during normal temperature operations.
Figure 1:
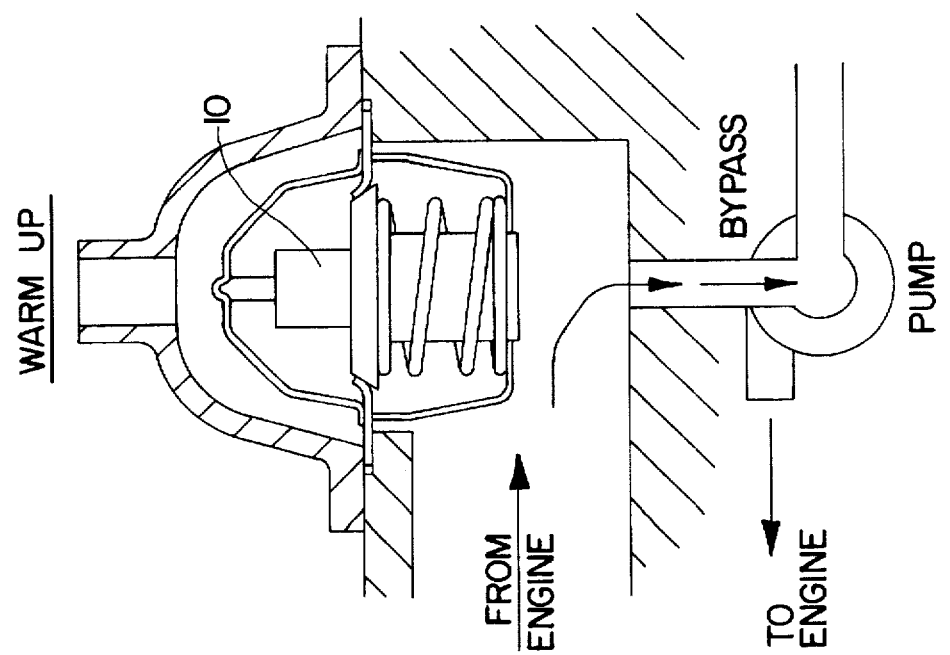
FIG. 1 is an illustration of a portion of a prior art automotive cooling system, during warm up operations.

While this invention is susceptible of embodiment in may different forms, there is shown in the drawings and will be described herein in detail, a specific embodiment, with the understanding that the present invention is to be considered as an exemplification of the principles of the invention, and is not intended to limit the invention to the embodiment illustrated.

FIGS. 1–4 illustrate prior art thermostat/valve operations, as discussed in detail previously. Accordingly, no further discussion of FIGS. 1–4 will be made.

Figure 5:
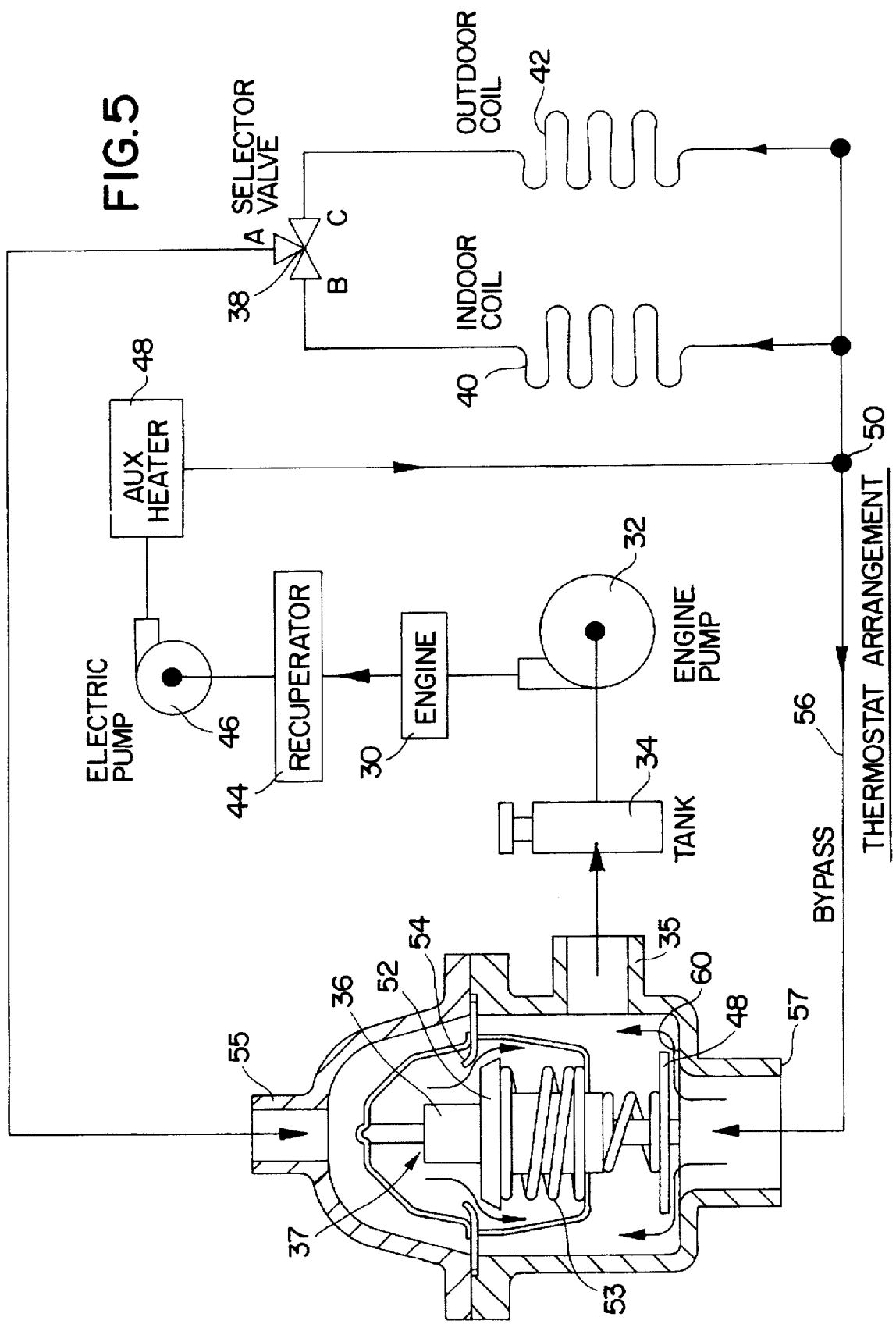
FIG. 5 is an illustration of a cooling system for a prime mover for a gas driven heat pump, according to the present invention.

FIG. 5 illustrates schematically a cooling system configuration, in accordance with the present invention, for use with a prime mover (such as an internal combustion piston engine) for a heat pump system. The cooling system for prime mover 30 includes a pump 32, a reservoir or tank 34, a thermostatic valve unit 37 with thermostat element 36, and a selector valve 38 which is configured to direct, or rather permit, coolant flow through either an indoor coil 40 or an outdoor coil 42, preferably to the exclusion of the other, although some operational modes may be contemplated in which some flow through both coils might be desired. A recuperator 44, electric (auxiliary) pump 46 and auxiliary heater 48 may also be provided, for systems in which it is desired to have an auxiliary or emergency heating capability. Alternatively, the coolant output from engine 30 may be directly connected to the piping between the coils 40, 42 and thermostatic valve 37, at point 50.

Depending upon whether the heat pump system is operating in a heating mode or a cooling mode, suitable controls (not shown, but which may be of known design) will cause selector valve to be switched to permit flow through one of coils 40, 42. For heating operations, selector valve 38 will be set to connect ports A and B, to permit flow through the indoor coil 40. For cooling operations, selector valve 38 will be set to connect ports A and C, to permit flow through the outdoor coil 42.

Numerous temperature-sensitive mechanisms have been utilized to actuate thermostatic valves. Common schemes include bellows filled with alcohol, bi-metallic mechanisms, and wax-filled cylinders. The wax "motor" is commonly used for domestic water tempering and automotive applications. The wax motor is simple, inexpensive and generally long-lived. The wax motor can only apply force in one direction and thus must rely upon a spring or other device to provide the return stroke. For a preferred embodiment of the present invention, a wax motor thermostatic valve was selected for the heat pump cooling system, based upon known performance characteristics and the common availability of such thermostatic valves.

For heat pump systems, such as illustrated in FIG. 5, in which an auxiliary heater 48 is provided to add heat, as desired to the coolant after the coolant has exited the engine 30, a NAPA P/N 38 (160 degree F.) thermostatic valve (or its functional equivalent) is presently preferred to be used as thermostatic valve 37. For heat pump systems in which no auxiliary heater 48 is placed in the coolant circuit (e.g., heat pump systems in which auxiliary heating is provided by the domestic hot water system), a NAPA P/N 138 (180 degree F.) thermostatic valve (or its functional equivalent) is preferred to be used.

In operation, upon start-up, disc 52 of valve 37 will be held in its seat 54 by spring 53, preventing flow through inlet 55, and, in turn, preventing flow through selector valve 38, and forcing all of the coolant to circulate through outlet 35, through engine 30 (and the other components previously described, if present) and through the bypass leg 56, to inlet 57 of valve 37. Disc 48 will be raised off of its respective seat 60 (farther than illustrated in FIG. 5), to permit substantial flow through the bypass route.

Once engine 30 has been operating long enough to get up to operating temperature, temperature-sensitive expandable element 36 of valve 37 will expand, overcoming the force exerted by spring 53 and pushing disc 52 off of seat 54, to permit flow through inlet 55 and selector valve 38 (as illustrated in FIG. 5). Simultaneously, disc 48 will be pushed toward, but not completely against, seat 60, so as to restrict the amount of bypass flow which is permitted, so that a maximum amount of hot coolant is forced to circulate through whichever of the coils has been selected by selector valve 38, for delivery of a maximum amount of heat either to an indoor space for heating, or to an outdoor coil for release of heat. Thereafter, valve 37 will modulate, depending upon the temperature of the coolant, as the coolant passes through. If the temperature of the coolant which is bypassing the (indoor or outdoor) coil is too high, the degree to which valve 37 is displaced, causing disc 48 to close off flow through the bypass leg 56, will increase until substantially all flow is through the coil, thus causing the overall coolant temperature to drop. Accordingly, thermostatic valve 37 will be selected to have a first operative temperature, equal to a minimum desired operating temperature, which will just open to permit flow through inlet 55. At a second operative temperature, equal to a maximum permissible operating temperature, valve 37 will be displaced sufficient to substantially close off the bypass leg 56, to ensure that maximum transfer of heat out of the coolant will take place. At an intermediate temperature, which will be advantageously selected to be the optimum operating temperature, flow through both the bypass leg 56 and the coil(s) will be permitted.

Figure 6:
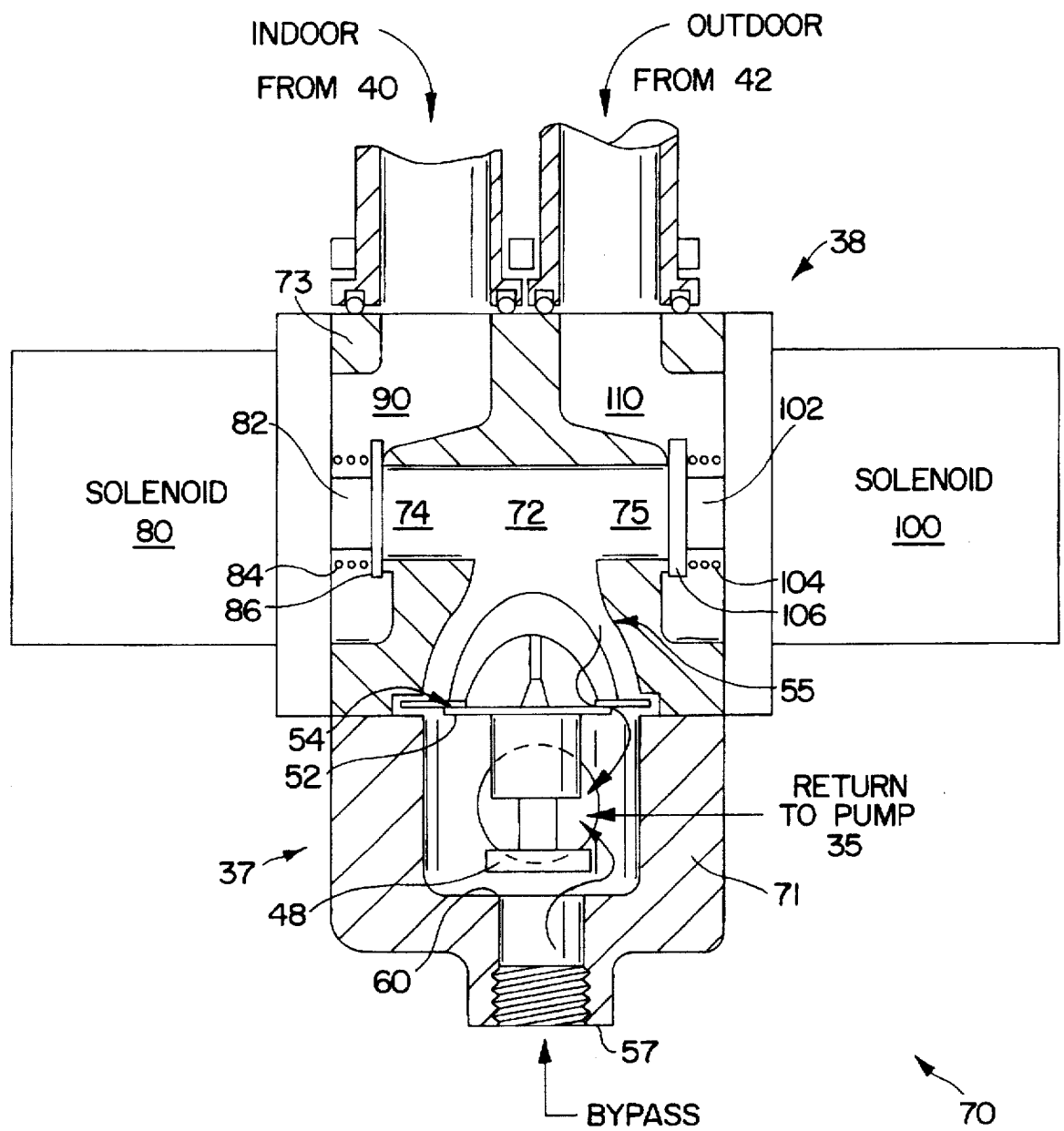
FIG. 6 is an illustration of a valve-thermostat apparatus for use in the cooling system of FIG. 5.

In a preferred embodiment of the invention, thermostatic valve 37 and selector valve 38 will be configured as an integrated unit 70, as illustrated in FIG. 6. Integrated valve 70 may be formed from two housing components 71, 73, and comprises thermostatic valve unit 37 and selector valve portion 38. Inlet 55 of thermostatic valve unit 37 connects to a central passage 72 having two inlets 74, 75.

Solenoid 80 is provided to control inlet 74, which opens to passage 90 which, in turn, is connected to indoor coil 40. Solenoid 80 includes plunger 82, coil 84 and disc 86, and is connected by suitable leads to a control apparatus such as a programmable controller or other apparatus.

Such control apparatus and connections may be of otherwise conventional configuration known to one of ordinary skill in the art, and so have been omitted from the illustration.

Solenoid 100 is provided to control inlet 75, which opens to passage 110 which, in turn, is connected to indoor coil 42. Solenoid 100 includes plunger 102, coil 104 and disc 106, and is connected by suitable leads to a control apparatus such as a programmable controller or other apparatus. Such control apparatus and connections may be of otherwise conventional configuration known to one of ordinary skill in the art, and so have been omitted from the illustration.

In a preferred embodiment of the invention, housings 71 and 73 will be configured to be connected together in a liquid-tight manner, and will be provided with suitable fittings and seals, according to known design techniques, for receipt of solenoids 80, 100, and for receipt of the liquid flow connections for bypass leg 56, indoor coil 40 and outdoor coil 42.

Figure 7:
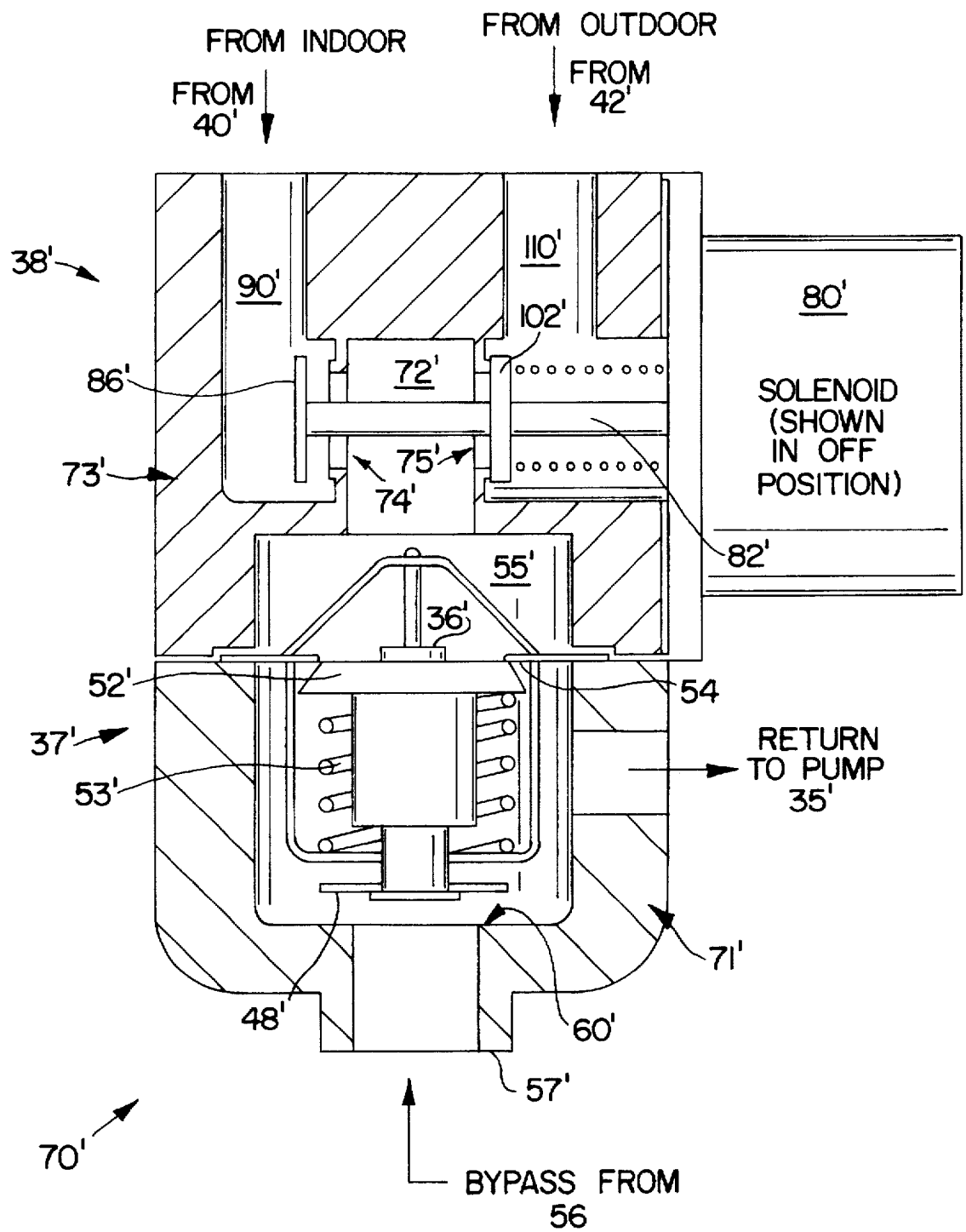
FIG. 7 is an illustration of a valve-thermostat apparatus, according to an alternative preferred embodiment of the invention, for use in the cooling system of FIG. 5.

An alternative embodiment of the valve-thermostat apparatus is shown in FIG. 7, wherein a single solenoid is connected to both selector valve seats. Like elements to those illustrated in FIG. 6 have been identified with like reference numerals, augmented with a prime (').

In operation, upon start-up, disc 52' of valve 37' will be held in its seat 54' by spring 53', preventing flow through inlet 55', and, in turn, preventing flow through selector valve 38', and forcing all of the coolant to circulate through outlet 35', through engine 30 (FIG. 5)(and the other components previously described, if present) and through the bypass leg 56, to inlet 57' of valve 37'. Disc 48' will be raised off of its respective seat 60' (farther than illustrated in FIG. 5), to permit substantial flow through the bypass route.

Once engine 30 has been operating long enough to get up to operating temperature, temperature-sensitive expandable element 36' of valve 37' will expand, overcoming the force exerted by spring 53' and pushing disc 52' off of seat 54', to permit flow through inlet 55' and selector valve 38' (as illustrated in FIG. 5). Simultaneously, disc 48' will be pushed toward, but not completely against, seat 60', so as to restrict the amount of bypass flow which is permitted, so that a maximum amount of hot coolant is forced to circulate through whichever of the coils has been selected by selector valve 38', for delivery of a maximum amount of heat either to an indoor space for heating, or to an outdoor coil for release of heat. Thereafter, valve 37' will modulate, depending upon the temperature of the coolant, as the coolant passes through. If the temperature of the coolant which is bypassing the (indoor or outdoor) coil is too high, the degree to which valve 37' is displaced, causing disc 48' to close off flow through the bypass leg 56, will increase until substantially all flow is through the coil, thus causing the overall coolant temperature to drop. Accordingly, thermostatic valve 37' will be selected to have a first operative temperature, equal to a minimum desired operating temperature, which will just open to permit flow through inlet 55'. At a second operative temperature, equal to a maximum permissible operating temperature, valve 37' will be displaced sufficient to substantially close off the bypass leg 56, to ensure that maximum transfer of heat out of the coolant will take place. At an intermediate temperature, which will be advantageously selected to be the optimum operating temperature, flow through both the bypass leg 56 and the coil(s) will be permitted.

In a preferred embodiment of the invention, thermostatic valve 37' and selector valve 38' will be configured as an integrated unit 70', as illustrated in FIG. 7. Integrated valve 70' may be formed from two housing components 71', 73', and comprises thermostatic valve unit 37' and selector valve portion 38'. Inlet 55' of thermostatic valve unit 37' connects to a central passage 72' having two inlets 74', 75'.

Solenoid 80' is provided to control both inlet 74', which opens to passage 90' which, in turn, is connected to indoor coil 40 and inlet 75', which opens to passage 110' which, in turn, is connected to indoor coil 42.

Solenoid 80' includes stem 82', and discs 86' and 106', and is connected by suitable leads to a control apparatus such as a programmable controller or other apparatus. Such control apparatus and connections may be of otherwise conventional configuration known to one of ordinary skill in the art, and so have been omitted from the illustration. Solenoid 82' preferably will be a single acting solenoid, having a spring 112 which will force the stem to a normal, unactuated "heating" position, as illustrated in FIG. 7. When solenoid 80' is actuated, stem 82' would move to the right, permitting flow from outdoor coil 42.

In a preferred embodiment of the invention, housings 71' and 73' will be configured to be connected together in a liquid-tight manner, and will be provided with suitable fittings and seals, according to known design techniques, for receipt of solenoid 80' and for receipt of the liquid flow connections for bypass leg 56, indoor coil 40 and outdoor coil 42.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

What is claimed is:

1. An apparatus for controlling the circulation of coolant fluid, for use in the coolant system for a prime mover, having two flow passages, such as two heat exchangers, connected parallel to one another in fluid circuit relationship with the prime mover and operably disposed at locations separate from the prime mover, the apparatus for controlling coolant circulation comprising:

a thermostatic valve apparatus operably connectable in a fluid circuit relationship with the prime mover and at least one of the two parallel flow passages, the thermostatic valve apparatus being operably configured to be disposed at a position relative to the prime mover, so that coolant exiting at least one of the two parallel flow passages must pass through the thermostatic valve apparatus before entering the prime mover, the thermostatic valve apparatus being further operably configured to permit coolant flow from at least one of the two flow passages to the prime mover only when the coolant has attained a predetermined minimum temperature; and flow selection means, operably and integrally associated with the thermostatic valve apparatus, and capable of distributing flow of coolant fluid exiting the thermostatic valve between two flow passages disposed in parallel fluid circuit relationships with the prime mover.

2. The apparatus for controlling coolant circulation for a prime mover according to claim 1, the thermostatic valve apparatus being further operably configured to vary, in a modulating manner, the relative proportions of coolant permitted to flow through the two flow passages.

3. The apparatus for controlling coolant circulation for a prime mover according to claim 1, the thermostatic valve apparatus being further configured to permit flow of coolant through the second flow passage only when the coolant has a temperature which is above a predetermined minimum temperature.

4. The apparatus for controlling coolant circulation for a prime mover according to claim 1, wherein the prime mover is a gas-driven engine for a heat pump system.

5. The apparatus for controlling coolant circulation for a prime mover according to claim 1, wherein the prime mover is a prime mover for a heat pump system, and one of the two flow passages is a heat exchanger situated within a structure for transferring heat from the coolant to the air of an occupied space within the structure.

6. The apparatus for controlling coolant circulation for a prime mover according to claim 1, wherein one of the two flow passages is a heat exchanger situated in an outdoor environment for transferring heat from the coolant to the ambient outdoor atmosphere.

7. An apparatus for controlling the circulation of coolant fluid, for the coolant system for a prime mover, wherein the coolant system includes at least one heat exchanger operably disposed at a location separate from the prime mover, the apparatus for controlling coolant circulation comprising:

a thermostatic valve apparatus, operably disposed in a first fluid circuit relationship with the prime mover and the at least one heat exchanger, the thermostatic valve apparatus being operably disposed at a position which is upstream of the prime mover, so that coolant exiting the at least one heat exchanger must pass through the thermostatic valve apparatus before entering the prime mover, the thermostatic valve apparatus being further operably configured to permit coolant flow from the at least one heat exchanger apparatus to the prime mover only when the coolant has attained a predetermined minimum temperature; the at least one heat exchanger including two heat exchangers connected parallel to one another in fluid circuit relationship with the prime mover and the thermostatic valve apparatus, the apparatus for controlling coolant circulation further comprising:

flow selection means, operably interposed in fluid circuit relationship between the two heat exchangers and the thermostatic valve, at a position downstream of the two heat exchangers, the flow selection means being operably configured to selectively permit flow through one of the two heat exchangers, to the exclusion of the other.

8. The apparatus for controlling coolant circulation for a prime mover according to claim 7, wherein the thermostatic valve apparatus and the flow selection means are operably configured as a single integrated unit.

9. An apparatus for controlling the circulation of coolant fluid, for the coolant system for a prime mover, wherein the coolant system includes at least one heat exchanger operably disposed at a location separate from the prime mover, the apparatus for controlling coolant circulation comprising:

a thermostatic valve apparatus, operably disposed in a first fluid circuit relationship with the prime mover and the at least one heat exchanger, the thermostatic valve apparatus being operably disposed at a position which is upstream of the prime mover, so that coolant exiting the at least one heat exchanger must pass through the thermostatic valve apparatus before entering the prime mover, the thermostatic valve apparatus being further operably configured to permit coolant flow from the at least one heat exchanger apparatus to the prime mover only when the coolant has attained a predetermined minimum temperature;

the at least one heat exchanger including two heat exchangers connected parallel to one another in fluid circuit relationship with the prime mover and the thermostatic valve apparatus, the apparatus for controlling coolant circulation further comprising:

flow selection means, operably interposed in fluid circuit relationship between the two heat exchangers and the thermostatic valve, at a position downstream of the two heat exchangers, the flow selection means being operably configured to selectively modulate the relative proportion of flow from the two heat exchangers through the flow selection means.

10. The apparatus for controlling coolant circulation for a prime mover according to claim 9, wherein the flow selection means is a three-way valve.

* * * * *